United States Patent [19]
Miesterfeld et al.

[11] Patent Number: 4,719,458
[45] Date of Patent: Jan. 12, 1988

[54] METHOD OF DATA ARBITRATION AND COLLISON DETECTION IN A DATA BUS

[75] Inventors: Frederick O. R. Miesterfeld, Troy; Ronald E. Fassnacht, Rochester; John M. McCambridge, Northville, all of Mich.

[73] Assignee: Chrysler Motors Corporation, Highland Park, Mich.

[21] Appl. No.: 832,909

[22] Filed: Feb. 24, 1986

[51] Int. Cl.⁴ .............................. H04Q 9/00; H04J 3/02
[52] U.S. Cl. ...................................... 340/825.5; 370/85
[58] Field of Search ........................ 340/825.5, 825.51; 370/85, 94

[56] References Cited
U.S. PATENT DOCUMENTS 4,429,384  1/1984  Kaplinsky ............................ 370/85
4,569,046  2/1986  Hadziomerovic et al. ...... 340/825.5
4,584,575  4/1986  Ryckeboer ....................... 340/825.5

Primary Examiner—Donald J. Yusko
Attorney, Agent, or Firm—Mark P. Calcaterra

[57] ABSTRACT

A method of blocking data transmission from a user microprocessor to a data bus utilizing arbitration and collision detection in a data bus interface integrated circuit utilizing a Serial Communication Interface (SCI) port on the user microprocessor.

3 Claims, 9 Drawing Figures

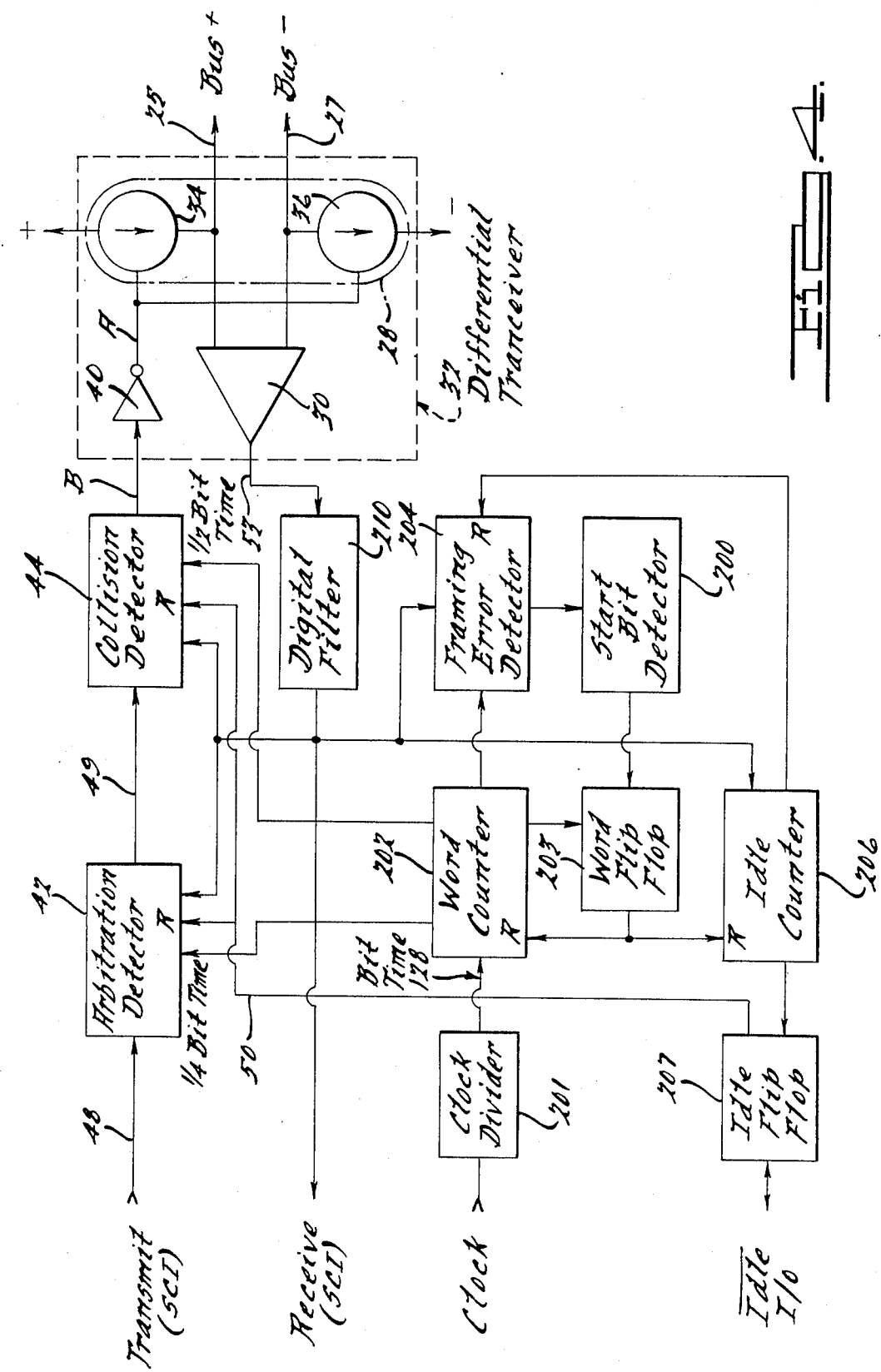

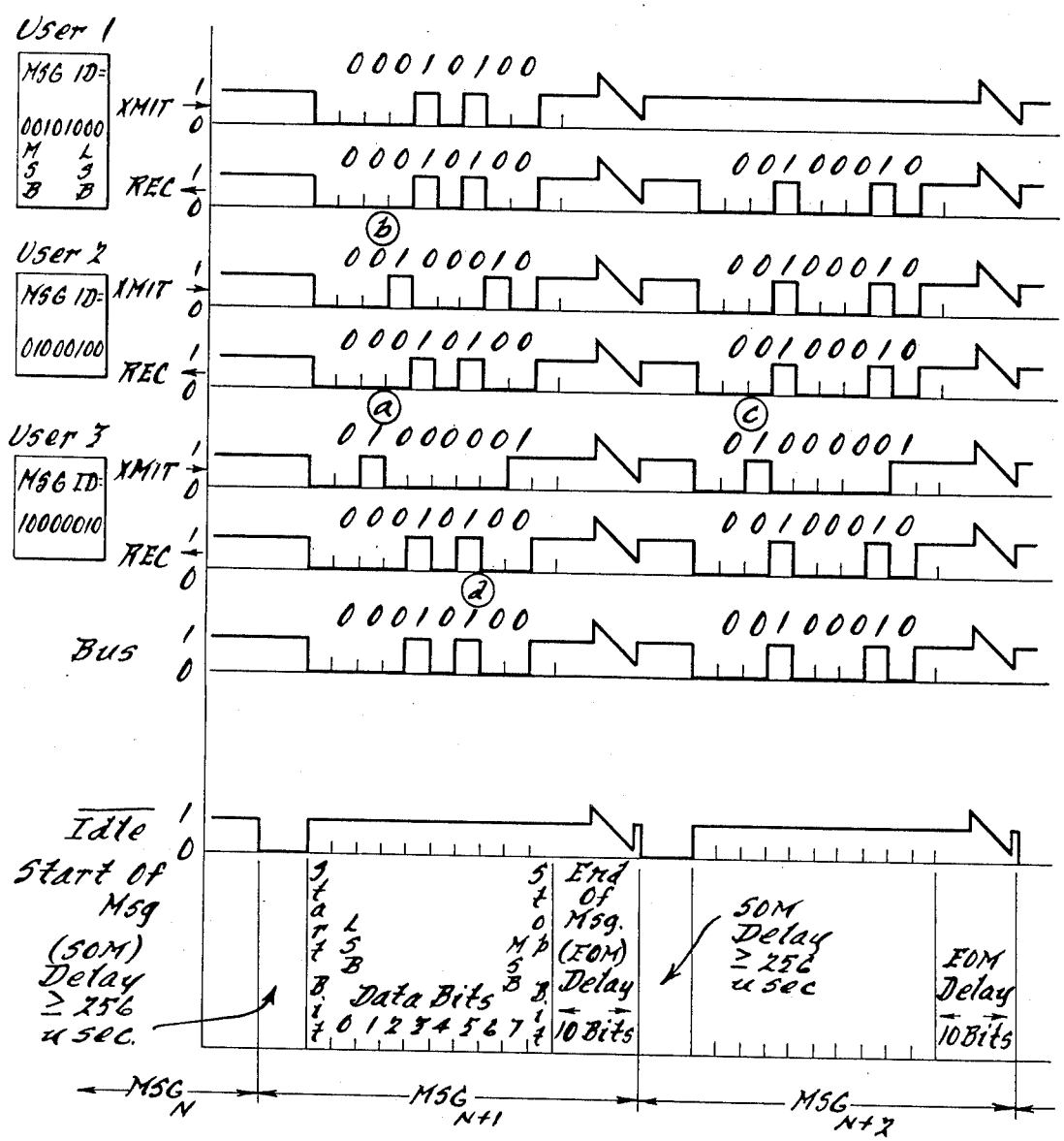

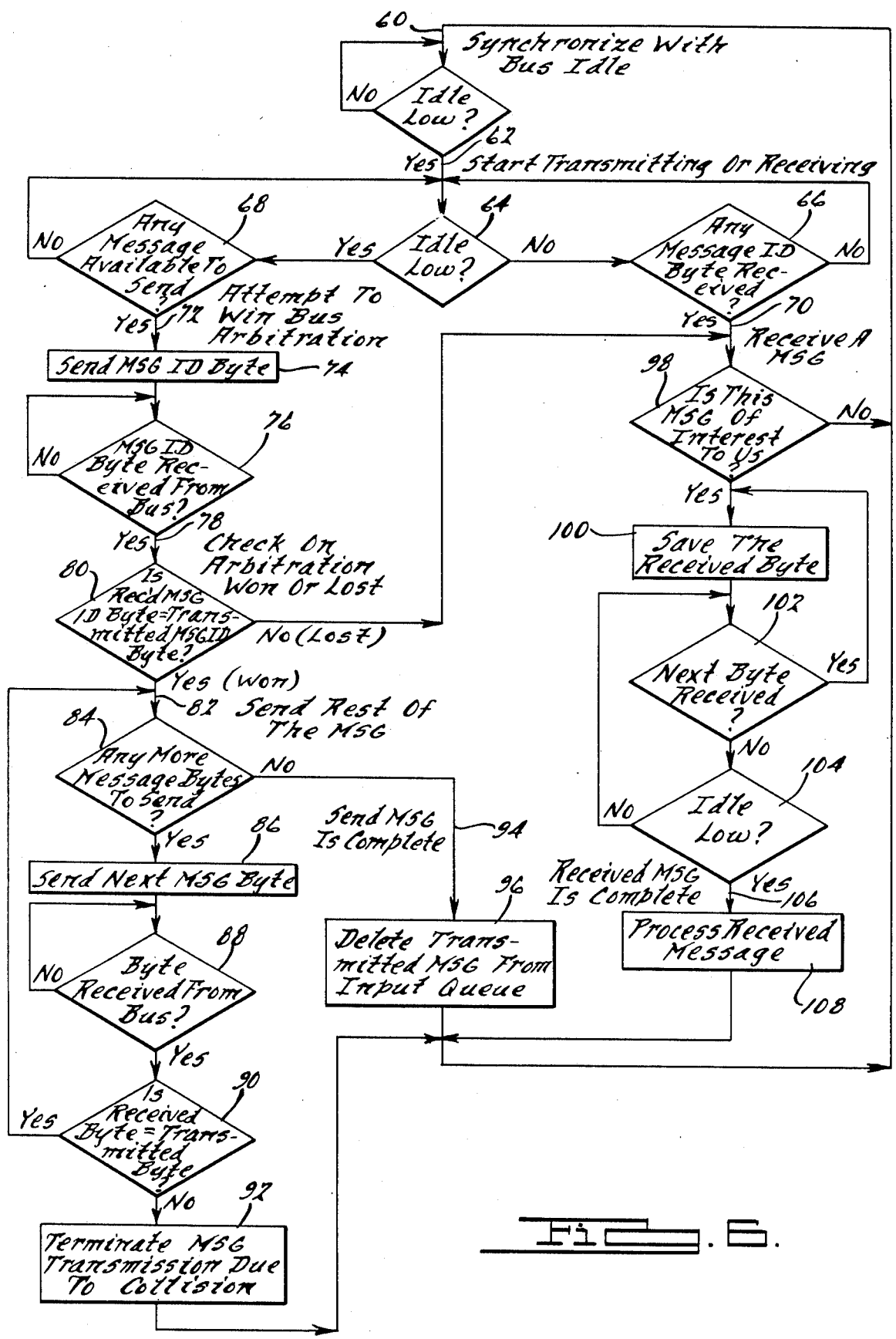

METHOD OF DATA ARBITRATION AND COLLISON DETECTION IN A DATA BUS

BACKGROUND OF THE INVENTION

1. Field Of The Invention

The purpose of the subject invention is to provide a data communication network for providing communication of parametric data between microprocessors and/or microcomputers. Although the particular embodiment described grew out of experiences in the automotive environment, such a bus could be adaptable to a variety of non-automotive applications, also. Although the interface integrated circuit developed is capable of supporting many types of higher level communications protocols, such as master-slave or token passing, it is primarily useful in a collision detection network.

2. Description Of The Pior Art

The demand for linking of isolated intelligence incorporated in microprocessors and microcomputers in various stand-alone equipment is well known.

Some solutions used to link the isolated intelligence of microprocessors and microcomputers include Local Area Networks (LAN). LANs link several microprocessors or microcomputers, each of which can take control of the serial data channel and transmit data to any other unit. Some of the problems of LANs are complex protocols, controllers and software, and the need for more complexity in larger systems.

In smaller applications which link several microprocessors or microcomputers within a relatively small area, a much less complex performance than is supplied by a typical LAN is needed to handle the throughput of a small number of microprocessor or microcomputer controlled units.

Known in the art is a digital data bus designed to handle the above-described level of performance. Such a digital data bus system is described in U.S. Pat. No. 4,429,384 to Kaplinsky issued on Jan. 31, 1984, "Communication System Having An Information Bus And Circuits Therefor".

Some of the major differences between the prior art noted above and the subject invention is that the prior art uses speed shifting and the subject invention operates at a constant speed. Another difference is that the prior art utilizes an acknowledged bit from the receiving station whereas the subject invention does not. As such, the subject invention does not require a tight link between the transmitting station and the receiving station(s) which would require that the receiving station(s) respond during a message transmission.

The heart of the subject invention over the prior art is the simplification of the communication link between message transmitter and message receiver.

Another thing added over the prior art to the subject serial data bus, is the interconnection with a serial communication interface (SCI) port.

SUMMARY OF THE INVENTION

The subject communications bus is a two wire differential signal system in which several user microprocessors are connected to the bus, in parallel, through a bus interface IC. All user microprocessors connected to the bus can receive all messages sent on the network. User microprocessors with messages to send follow a simple set of rules to arbitrate for the use of the bus.

All user microprocessors operate independently of each other. User microprocessors can be set up to only receive, only transmit or both receive and transmit messages.

This system is flexible and easily expandable. User microprocessors can be added and deleted with little or no impact on the operation of the bus or the other microprocessors on the bus other than that due to message volume or message protocol.

The bus operates at a predetermined baud rate and the bus interface IC depends on an externally supplied clock signal. Pin selectable clock divide options are available.

All messages on the bus use the following format:

message ID byte 1; message ID byte 2; . . . message IC byte N; data byte 1; data byte 2 . . . data byte N.

The message ID byte(s) is(are) a unique value that identifies the message and is(are) the first byte(s) of the message transmitted. At least one message ID byte is needed. The simultaneous transmission of the message ID bytes from several user microprocessors occurs during bus arbitration and the unique message ID values enable the collision detection system described herein to automatically select during arbitration one of the several transmitting users as the winner and, therefore, current user of the bus.

A given message is normally transmitted by only one user microprocessor on a given bus.

Messages are normally received by all user microprocessors on the bus and may be processed by one or more user microprocessors. User microprocessors may, after having received the message ID byte(s) of a message, decide that the message is not needed for their operation. The user microprocessor may then elect to wait for the next message ID byte(s) and, therefore, not take up the time necessary to receive any data bytes that may be transmitted with the current, not needed, message.

Data bytes and/or a message parity byte are optional and depend on the given message being transmitted.

A message parity byte is a byte that is transmitted during the data byte portion of the message and is used to check the correctness of the message ID bytes and other data bytes in the message.

There are no inherent limitations on the length of messages sent over the bus, but the anticipated usage of the bus for automotive communications requires only messages with lengths of one to six total bytes including the message ID byte and an optional message parity byte with most of the messages having lengths of two or three bytes.

All bytes are transmitted on the bus in an asynchronous format: start bit first, 8 data bits (least significant bit first) and a stop bit at the end using asynchronous non-return to zero (NRZ) coding. The start bit is a logic zero and a stop bit is a logic one.

The bus 26 is biased by pull-up resistor 58 and pull-down resistor 59 at a level approximately one-half the value of the difference between + and − sources. See the External Bias Circuit in FIG. 3.

The collision detection bus interface IC can support various modes of interface to the user microprocessor. The mode described herein is that of a serial communications interface (SCI).

The SCI mode is designed to interface the bus to the SCI facilities normally available in microprocessors (i.e., two wire, full duplex, asynchronous, byte/character orientation, medium speed).

Generally, during message transmission, while a byte is being transmitted to the bus, its reflected byte is simultaneously being received.

It is an object of the subject invention to simplify the point-to-point message format of state-of-the-art serial data buses by changing it to a broadcast message format. This means that the heart of simplification is the elimination of a word to identify the originator of the message and another word for the identification of the destination of the message. Instead of this point-to-point format, a message ID bytes is used to identify the data being transmitted or the information being communicated. In some cases, the message will consits of a message ID only. In other cases, the message ID will identify the data that follows the message ID. If need be, point-to-point format can still be accommodated.

It is an additional object of the subject invention to provide an SCI port as a part of the serial data interface IC.

DESCRIPTION OF THE DRAWINGS

Other objects, features and advantages of the present invention will become more fully apparent from the following detailed description of the preferred embodiment, the appended claims and in the accompanying drawings in which:

FIG. 4 is a more detailed block diagram of the bus interface IC;

FIG. 5 is a timing diagram showing an example of the collision detection bus interface IC operation during arbitration;

FIG. 6 is a general message processing flowchart; and

DETAILED DESCRIPTION OF THE PREFERRED EMBODIMENT

This application is one of two both filed on the same day and having similar specifications and drawings. The other case by the same applicants is entitled "Serial Data Bus For Intermodule Data Communications."

U.S. Pat. No. 4,429,384 issued to Kaplinsky and entitled "Communications System Having An Information Bus And Circuits Therefor" is hereby expressly incorporated by reference. Also hereby expressly incorporated by reference is the SAE Technical Paper No. 830536 entitled "Serial Bus Structures For Automotive Applications" by Anthony J. Bozzini and Alex Goldberger dated Feb. 28, 1983.

Lastly, and hereby expressly incorporated by reference is an SAE Technical Paper prepared by Frederick O. R. Miesterfeld entitled "Chrysler Collision Detection (C²D) A Revolutionary Vehicle Network" to be delivered at the 1986 Society of Automotive Engineers Conference on Feb. 26, 1986. The Miesterfeld paper will be assigned the number "SAE Technical Paper No. 860389." As printed copies were not available at the time of the filing of this application, a photocopy or the galley proof is enclosed.

Figure 1:
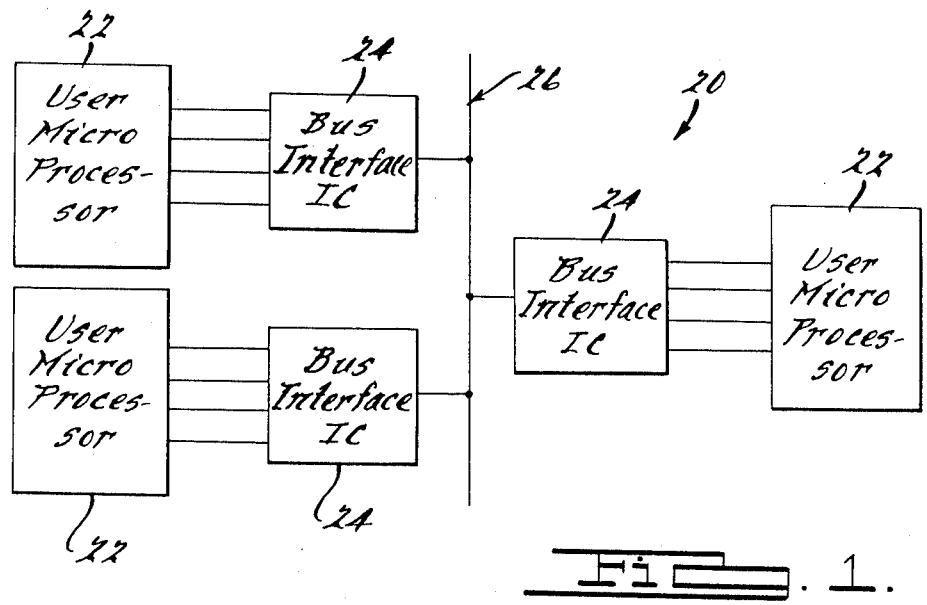
FIG. 1 is a block diagram showing the serial bus network.

Referring now to FIG. 1, the serial bus network 20 is shown. A large number of user microprocessors 22 may be connected to the bus 26 through the serial bus interface ICs 24.

Figure 2:
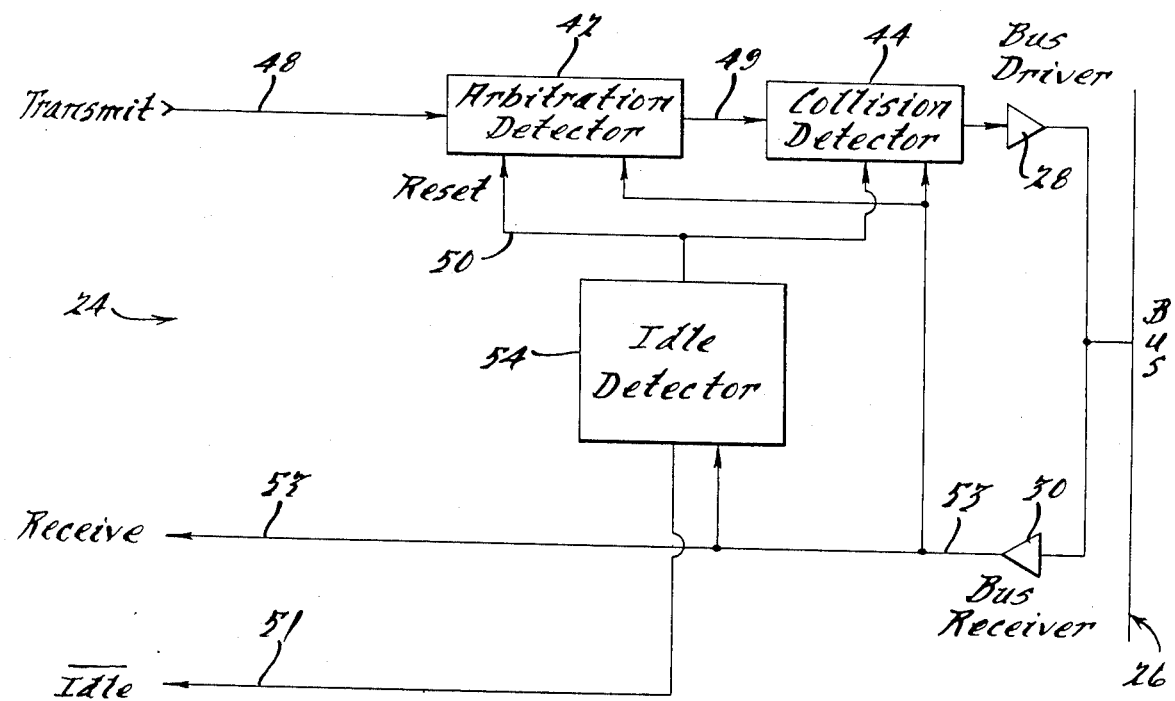
FIG. 2 is a simplified block diagram of the bus interface IC showing some of the functional internals of the bus interface IC.

Referring now to FIG. 2, the bus interface IC 24 is broken down to illustrate some of its internal functions. The IC 24 is still connected to the bus 26 via bus driver 28 and bus receiver 30.

The differential output circuit defined by bus driver 28 is used in the bus interface IC 24 to transmit data onto bus 26 and gives priority to a zero bit over a one bit.

The nominal or idle signal on the bus 26 is a logic one bit. If the bus is idle or if a user microprocessor 22 is sending a logic one bit, then a logic one appears on the bus 26 and is presented to bus receiver 30 and eventually onto line 53 for presentation to a user microprocessor 22. Only when at least one bus interface IC 24 sends a logic zero bit, does a logic zero bit appear on the bus 26.

If one or more bus interface ICs 24 output a logic one bit on the bus 26 and at least one bus interface IC 24 is outputting simultaneously a logic zero bit, then a logic zero bit will appear on bus 26. When one IC 24 outputs a logic zero bit, it wins over all other modules simultaneously outputting logic one bits.

If multiple bus interface ICs 24 want to send a message on the bus 26 simultaneously, they go through arbitration which starts after occurrence of a logic low signal on idle line 51 (an idle condition on the bus) for at least ¼ bit time where one bit time is equal to the input clock frequency +128.

FIG. 2 will be explained in greater detail below.

Figure 3:
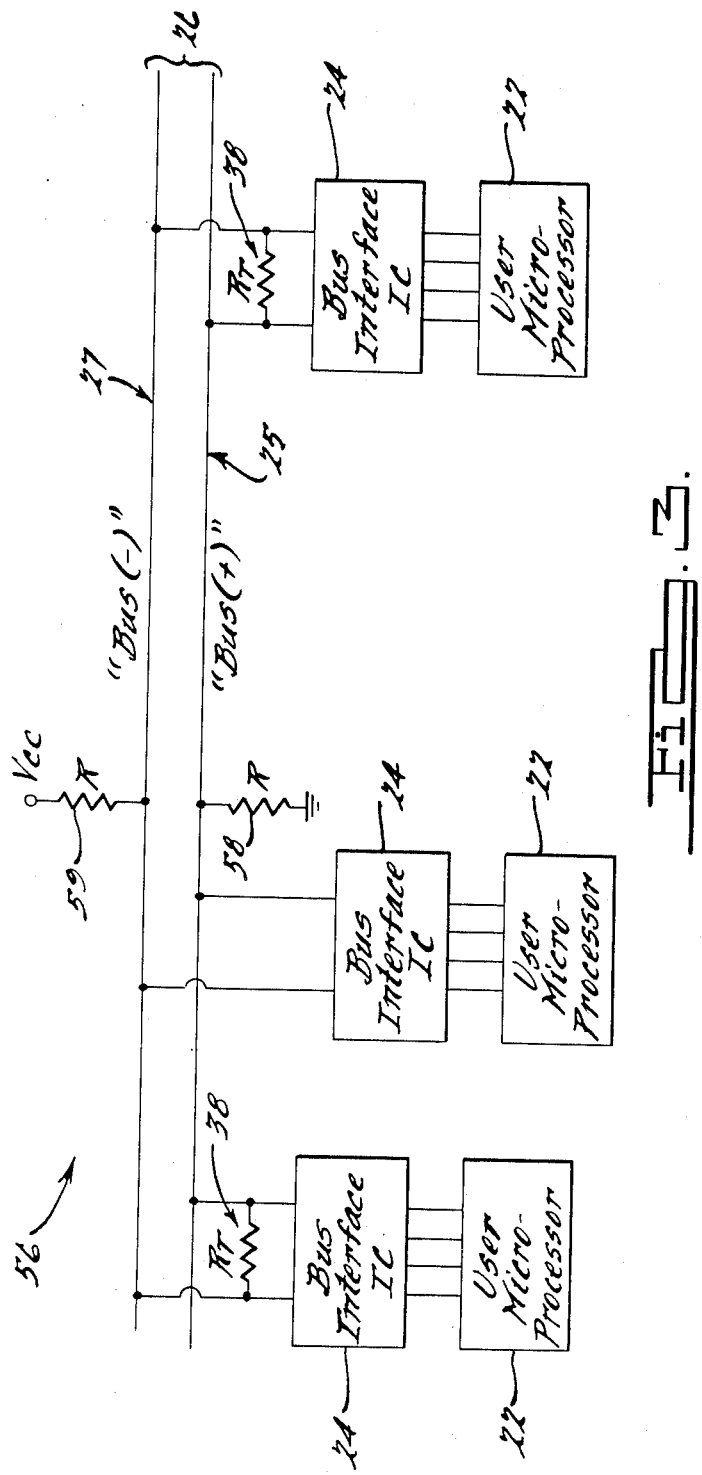
FIG. 3 is an External Bias Circuit.

Referring now to FIG. 3, the external bias circuit 56 is illustrated. A voltage supply $V_{CC}$ is connected to the bus 26 by means of a pull-down resistor 59 and a pull-up resistor 58 that completes the circuit to ground. The bus 26 consists of a two wire twisted pair with the Bus+25 side being connected to pull-up resistor 58 and the Bus−27 side being connected to the pull-down resistor 59. Connected to the (+) and (−) sides of bus 26 are two wires connecting the bus interface IC 24. The interface IC 24 is, in turn, connected to a user microprocessor 22 as shown.

Two termination resistors $R_T$ are shown connected across two interface ICs 24 at the physical ends of the network. Other interface ICs 24 are tapped off of the main twisted pair and do not require a termination resistor.

Communication theory deals with hardware and usually two or three layers of message protocol to get down to the message information carried in the transmission. In the subject invention, communication is done via two wires to minimize radio frequency interference.

The principle used in the subject invention to create a signal to transmit information deals with the pulling up of one wire of the bus with a current and the pulling down the other wire of the bus with an equal and opposite current such that the net AC effect is zero.

The termination resistors $R_T$ 38 connected to the Bus−27 and Bus+25 lines at the ends of the bus 26 are used to match the characteristic impedance of the bus 26 and thereby minimize the generation of moise by the bus 26 and minimize the effect on the bus 26 from noise generated by other signal generating systems.

The effect of this theory on the data bus can be seen by looking at the circuit shown in FIG. 3 and that of the block diagram of the bus interface IC shown in FIG. 4.

Attention is invited to Bus+25 and Bus−27 in both FIGS. 3 and 4 to shown where the two figures are matched on the bus side. The TRANSMIT, RECEIVE, CLOCK and IDLE lines shown in FIG 4 connect to the user microprocessor 22 as illustrated in FIG. 3.

It can be seen, therefore, that when the lines 25 and line 27 from the bus 26, as connected to the bus interface IC 24, have practically the same potential when connected with resistors $R_T$38 at the ends of the bus 26, that this condition can be defined as a logical one. Likewise, when the lines 25 and 27 are separated or driven with an equal and opposite current from the differential transceiver 32 shown in FIG. 4, that condition can be defined as a logical zero.

It should be noted that the system shown illustrates a data bus 26 with twpo wires or lines and several loads connected in parallel. Assume for a moment that there are only two loads, one at each end of the wires or lines. The two wires or lines are a twisted pair with a characteristic impedance due to that twisted pair. An impedance $R_T$ is included at each end of the bus 26 to match the characteristic impedance of the bus 26. $R_T$ is a termination resistor and is shown as 38 in FIG. 3. The circuitry of the differential transciever 32 is shown in FIG. 4.

Returning now to FIG. 2, attention is invited to arbitration detector 42 which is connected to the bus driver 28 via collision detector 44. The arbitration detector 42 checks for the reception of the beginning of a start bit from the user microprocessor 22 within a predetermined time after or before the arbitration detector 42 detects the beginning of a start bit on bus 26. It makes the detection of a start bit from the bus 26 by monitoring the output of the bus receiver 30. If the arbitration detector 42 does not detect the beginning of a start bit from the user microprocessor 22, either before or within ¼ bit time after detecting a start bit from the bus 26, the arbitration detector 42 blocks the user microprocessor 22 from accessing the bus 26 until the beginning of the next start bit on the bus 26 or from the user microprocessor 22.

The collision detector 44 compares the bits being sent to the bus 26 from the user microprocessor 22 via the arbitration detector 42 with the bits being received by the bus receiver 30 from the bus 26. The collision detector 44 also controls the connection between the user microprocessor 22 and the bus 26, either allowing the user microprocessor's 22 signal bits on TRANSMIT line 48 to reach the bus 26 or by blocking the bits from reaching the bus 26.

The collision detector 44 begins to block data from reaching the bus 26 as soon as it detects a difference between the current bit the user microprocessor 22 is trying to send on the bus 26 and the current bit the bus receiver 30 is receiving from the bus 26.

Once set, the collision detector 44 will continue to block user microprocessor 22 transmitted data from reaching the bus 26 until it is reset at the bus idle condition.

The collision detector 44 differs from the arbitration detector 42 in that the collision detector 44 compares all of the bits, bit by bit, of the transmitted and received bytes, start bit through stop bit inclusive, and it does the comparison at or near the middle of the bit interval.

The arbitration detector 42 only samples the start bit of every byte and does its comparison a designated time period (¼ bit time) after the beginning of the start bit.

The arbitration detector 42 and the collision detector 44 are reset via line 50 to allow the user microprocessor 22 to again arbitrate for the bus 26 after bus idle occurs.

User microprocessors 22 that lose arbitration normally will not try to send any additional message bytes once they have lost. But if they do, all of the message bytes that they may try to send to the bus 26 via bus driver 28 will be blocked from reaching the bus 26 by the arbitration detector 42 and the collision detector 44.

When a user microprocessor 22 transmits a message on the bus 26, it should check the value of the idle signal on line 51 first. If the idle signal on line 51 is at a low logic value or has just gone to a low logic level from a high logic level, the user microprocessor 22 can begin to send the first message ID byte of the message to be transmitted to the bus interface IC 24 through the TRANSMIT signal on line 48.

The signal received by the bus interface IC 22 through the TRANSMIT connection 48 is sent to the arbitration detector 42. The arbitration detector 42, after having received a reset signal on line 50 from the idle detector 54, checks that the beginning of the start bit of each byte received from the user microprocessor 22 through the TRANSMIT signal on line 48 has arrived at the arbitration detector 42 before, at the same time or within ¼ bit time after the beginning of a start bit has appeared on the bus 26. The arbitration detector 42 receives any data on the bus 26 through the bus receiver 30. The output of the bus receiver 30 is a signal on line 53. If, after the arbitration detector 42 has received a reset signal on line 50, the beginning of a start bit appears at the TRANSMIT signal line 48 before, at the same time or within ¼ bit time after the arbitration detector 42 detects the beginning of a start bit on the bus 26, the arbitration detector 42 passes the signal it is receiving from the TRANSMIT signal on line 48 unchanged to its output 49 and continues to do so until it determines that a stop bit has been correctly received from the bus 26 or it again receives a reset signal on line 50 at which time it again checks for the beginning of the next start bit from the TRANSMIT signal on line 48 and/or from the bus 26 via the bus receiver 30. If, after the arbitration detector 42 determines that a stop bit has been correctly received or it has received a reset signal 50, the beginning of a start bit appears at the TRANSMIT signal on line 48, more than ¼ bit time after the arbitration detector 42 detected the beginning of a start bit on the bus 26, the arbitration detector 42 begins to send a constant high locig level signal through its output 49 and continues to send a high level logic signal and not monitor the beginnings of start bits until after it determines that a stop bit has been correctly received or it receives the next reset signal on line 50.

The output of the arbitration detector 42, signal 49, is sent to the collision detector 44.

After having received a reset signal on line 50, the collision detector 44 compres, at the middle of each bit interval, the signal received from the arbitration detector 42, signal 49, with the output signal of the bus receiver 30, the signal on line 53. If after having received a reset signal on line 50, the logic level of the signal from the arbitration detector 42, the signal on line 49, is equal to the logic level of the signal output from the bus receiver 30, the signal on line 53, then the collision detector 44 continues to pass the signal received from the arbitration detector 42, the signal on line 49, to the bus driver 28. The first time after having received the reset signal on line 50 that the logic level of the signal on line 49 is a logic level one and the signal on line 53 is a logic level zero, the collision detector 44 outputs a constant high logic level signal to the bus driver 28 which has the effect of blocking the data received from TRANSMIT line 48 from transmittion onto the bus 26 and continues to do so until it receives another reset signal on line 50.

The reset signal on line 50 is generated by the idle control detector 54 when the detector 54 detects the beginning of an idle condition. The detector 54 detects the beginning of the idle condition by sensing a continuous bus idle signal level for 10 continuous bit times after having detected a stop bit signal level 8 bit times or more after having detected a start bit on line 53. If, after 8 bit times after having detected a start bit on line 53, a stop bit signal level is not received, the idle control detector 54 waits until a stop bit level signal is detected before it gegins to count down the continuous 10 bit long period of bus idle signal. This action is classified as a framing error and the collision detector 44 blocks further sampling for a start bit until the idle control detector 54 senses 10 continuous bus idle signals.

If, during the count down of the 10 bit bus idle period, a non-idle level signal is detected by the idle control detector 54 which lasts for ¼ bit time or less, the 10 bit idle period is restarted. If the non-idle signal lasts for longer than ¼ bit time, the signal is classified as the beginning of a start bit and the idle control detector 54 begins again to count down the 8 bits times after the start bit. This action is classified as normal data transmission and a reset signal on line 50 is not generated.

At the same time that the reset signal on line 50 is generated, the idle control detector 54 also changes the idle signal on line 51 from a high logic level to a low level. The idle control detector 54 switches the idle signal on line 51 to a high logic level whenever it detects after having been reset to a low logic level by the detection of a bus idle condition, a non-idle signal level on line 53. If the non-idle signal lasts for ¼ bit time or les, the idle signal on line 51 returns to a low logic level as soon as the non-idle signal returns to the idle level. If the non-idle signal lasts for longer than ¼ bit time, the signal is interpreted as the beginning of a start bit and the idle signal on line 51 continues to stay at a high logic level until an IDLE condition is detected and the reset signal on line 50 is generated again.

Referring now to FIG. 4, the combination of the bus driver 28 and bus receiver 30 is called the differential transceiver 32. The bus driver 28 consists of a current source 34 and a current sink 36. The current source 34 and the current sink 36 are connected to the external bias circuit as shown in FIG. 3. The current source 34 and current sink 36 are interconnected with termination resistors 38 at the ends of the bias which are matched to be the characteristic impedance of the bus 26. This is shown in FIG. 3. The bus 26 consists of a plus wire 25 and a minus wire 27. The resistor 38 is connected across the two wires or lines 25 and 27 across the bus interface IC 24 at each end of the bus 26. Also connected across line 25 and line 27 is the bus receiver 30.

The signal received on the TRANSMIT connection 48 is passed through the arbitration detector 42 and the collision detector 44 and on to the bus driver 28, when transmitted from the user microprocessor 22.

The coded signal from the collision detector 44 is presented to an inverter 40 on line B.

A logic zero on line B presented to inverter 40 will eventually turn the bus driver 28 on. The logical zero at the input to inverter 40 results in a high output from the inverter on line A. This high output turns on current source 34 and current sink 36. This action holds or drives the Bus+25 and Bus−27 lines apart with an equal and opposite current. This results in the logical zero output from the bus receiver 30. This predominates over a logical one at a relaxed or idle state.

A low output from the inverter 40 on line A shuts off current source 34 and current sink 36 thereby allowing the Bus+25 and Bus−27 lines to return back to a relaxed or idle state if no other bus interface ICs 24 are simultaneously driving the bus 26 to a logical zero level.

The circuit and method shown herein utilizes a Serial Communication Interface (SCI) of the user microprocessor 22. This is basic to the operation of the bus interface IC 24.

When the start bit detector 200 senses a valid start bit via word flip flop 203, it causes the word counter 202, to synchronize itself to the timing of the received data word. The word counter 202 is used to generate a ¼ bit time pulse for the arbitration detector 42 and a ½ bit time pulse for the collision detector 44. This is accomplished via the clock signal from user microprocessor 22 and clock divider 201.

The word counter 202 triggers the framing error detector 204 at the stop bit time. If the stop bit is not detected, the idle counter 206 is extended by the framing error detector 204 until a stop bit level signal is detected.

The collision detector 44 samples the transmitted input and the received output. The function of collision detector 44 is to block transmissions that could interrupt bus operations. Functionally, it accomplishes this by allowing transmissions to start only when the bus 26 is idle.

If two or more systems want to transmit at about the same time, the collision detector 44 will allow transmission on a first come, first serve basis. If these systems both try to transmit in synchronism, i.e., within an arbitration window of ¼ bit time, the collision detector 44 will permit only the one with the highest priority message ID byte(s) to continue transmitting.

When a user microprocessor 22, connected to the bus 26, is ready for transmission, it utilizes the following procedure.

First, the user microprocessor 22 looks at the IDLE line and waits until it goes to a logic zero via idle flip flop 207 indicating that the bus 26 is idle.

Next, the user microprocessor 22 tries to transmit the first message ID byte associated with the data to be transmitted.

If the user microprocessor 22 started transmitting first or has the highest priority message ID byte(s), the collision detector 44 will permit the transmittion.

The user microprocessor 22 confirms transmission by reading the received message ID byte and comparing it with the message ID byte the user microprocessor 22 wanted to transmit. If the same message ID byte was transmitted, the rest of the message can be transmitted. If not, the user microprocessor 22 must check to see if the received message ID byte and data is needed for its own use.

Data collision may result due to outside interference or a request for arbitration when long data strings are transmitted. The user microprocessor 22 that is transmitting data can compare the transmitted data with the received data for this type of data collision. Appropriate action should then be taken by the user microprocessor 22.

Figure 4A:
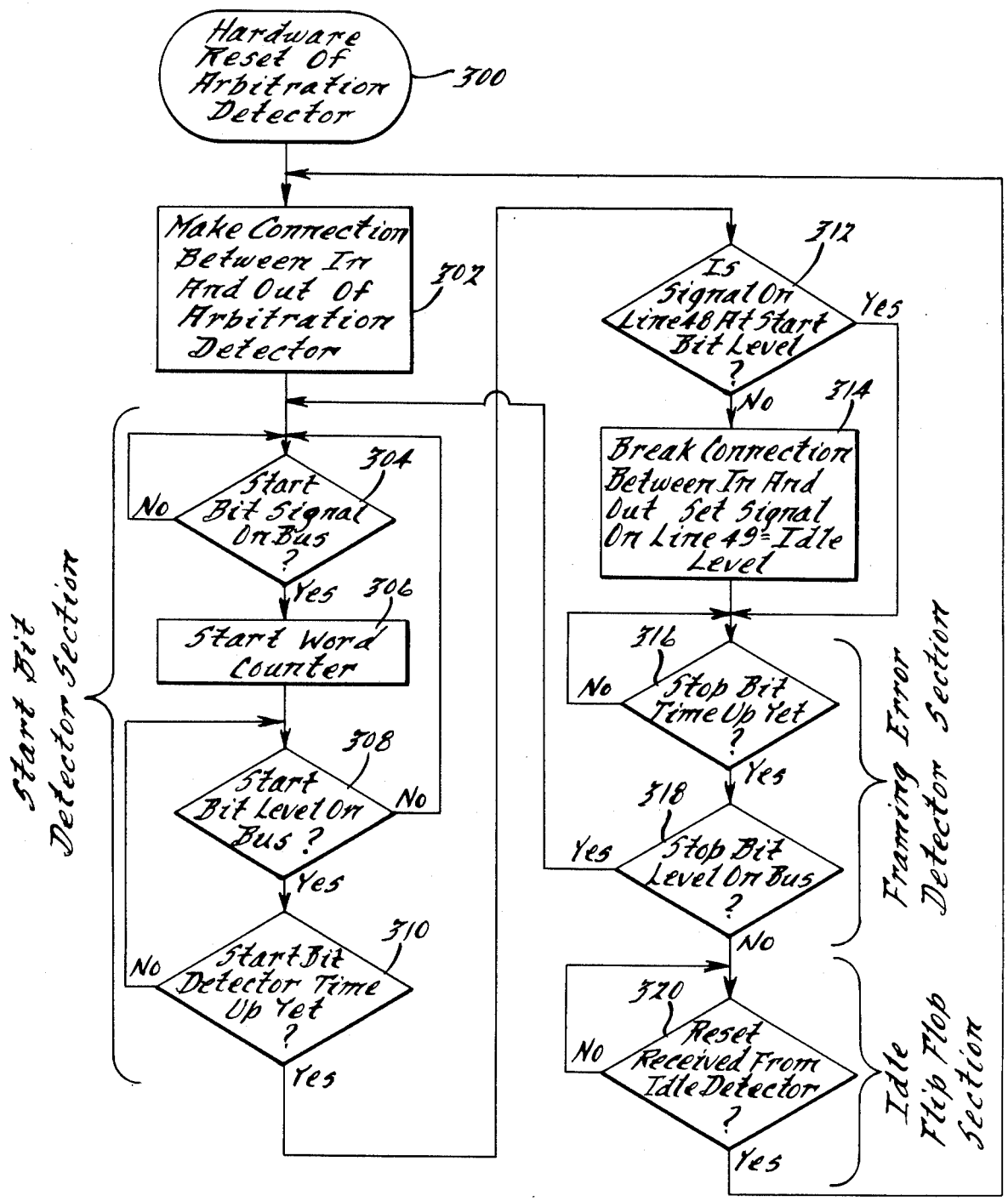
FIG. 4a is a flowchart showing how the arbitration works.
Figure 4B:
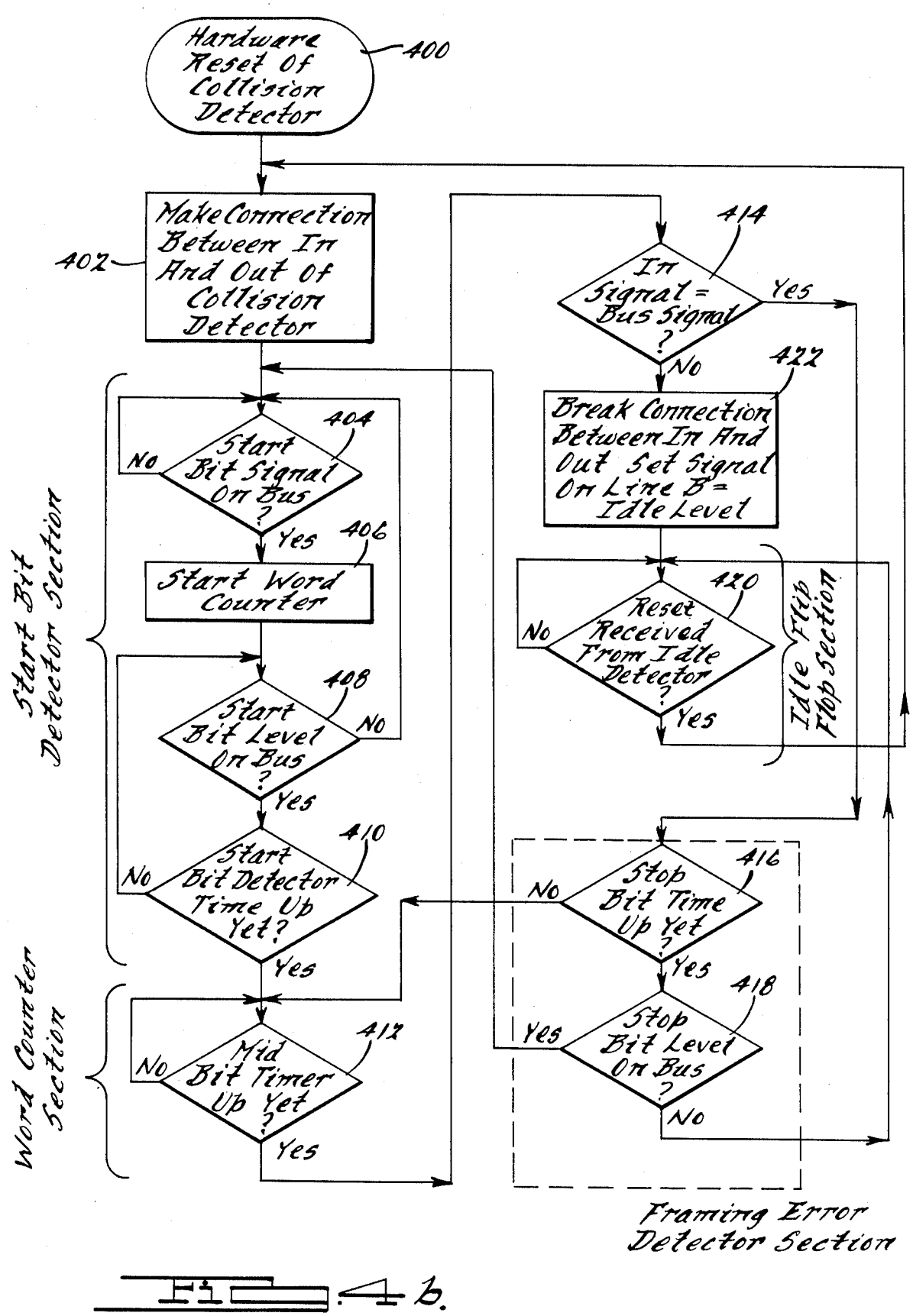
FIG. 4b is a flowchart showing how the collision detector works.

More specifically, the operation of the arbitration detector 42 is explained in conjunction with the flowchart shown in the FIG. 4a and the operation of the collision detector 44 is more fully shown with respect to the flowchart shown in FIG. 4b.

Referring to FIG. 4a, a hardware reset signal is sent to the arbitration detector 42 in block 300 turning the arbitration detector 42 on. A connection is made in the arbitration detector 42 between the input on line 48 and the output on line 49. This is done in block 302.

In decision block 304, the arbitration detector 42 determines whether there is a start bit on the data bus 26. If not, the arbitration detector 42 waits. If the start bit signal is on the data bus 26, the arbitration detector 42 starts the word counter 202 in block 306.

Next, the arbitration detector 42 determines whether the start bit level is on the data bus 26. This is done in block 308. If not, the system returns to block 304 to recheck the start bit signal on the data bus 26.

If the start bit level is on the data bus 26, the start bit detector 200 is polled to see whether the start bit detector time is up yet. If it is not, the arbitration detector 42 returns to block 308 to recheck the start bit level on the bus 26. If the start bit detector time is up as checked in block 310, the arbitration detector 42 has completed its use of the functions performed by the start bit detector 200 in blocks 304, 306, 308 and 310.

Next, the arbitration detector 42 in block 312 checks to see if the signal on its input line 48 is at the start bit level. If it is not, the connection is broken between the input and output of arbitration detector 42 and the arbitration detector 42 sets the signal on its output line 49 equal to the idle level. This is done in block 314. If the signal level on the input to the arbitration detector 42, as checked in block 312, is at the start bit level, the arbitration detector 42 branches to block 316 interfaced with the framing error detector 204 in blocks 316 and 318. In block 316, the arbitration detector 42 checks to see whether the stop bit time period is up yet. If it is not, the arbitration detector 42 waits. If the stop bit time is up, the arbitration detector 42 checks with the framing error detector 204 to see if the stop bit level is on the data bus 26. This is done in block 318. If the stop bit level is on the bus 26, the arbitration detector 42 returns to block 304 to begin the procedure from that point forward by rechecking the start bit signal to see whether it is on the bus 26.

If the stop bit level is on the bus 26 as checked in block 318, the arbitration detector 42 looks at information supplied by the idle flip flop 207. The arbitration detector 42 checks to see whether a reset signal is received from the idle detector 42 which in this case is the idle flip flop 207. If no reset signal has been received, the arbitration detector 42 waits. If a reset signal is received, the arbitration detector 42 returns to block 302 to again make the connection between the input and output of the arbitration detector 42 to begin arbitration again.

Returning now to the collision detector 44, an explanation of the flowchart in FIG. 4b is provided. If a hardware reset signal is received at the collision detector 44, the collision detector 44 proceeds from block 400 to block 402 to make a connection between the input and output of the collision detector 44. This connects the input line 49 to the output line B.

Next, the collision detector 44 checks the start bit signal on the bus 26 in block 404. If the start signal is not on the bus 26, the collision detector 44 waits. If the start bit signal is on the bus 26, the collision detector 44 moves to block 406 to start the word counter 202. Following the start of the word counter 202, the collision detector 44 checks to see whether the start bit level is on the data bus 26. If the start bit level is not on the bus 26, the collision detector 44 returns to block 404 to recheck to see if the start bit signal is on the data bus 26. If the start bit level is on the data bus 26, the collision detector 44 proceeds to block 410 to check to see whether the start bit detector time is up yet. This check is of a condition in the start bit detector 200. If the start bit detector time is not up yet, the collision detector 44 returns to block 408 to recheck to see whether the start bit level is on the data bus 26. If the start bit detector time is up, the collision detector 44 has ended its involvement with the start bit detector 200 from blocks 404, 406, 408 and 410.

The collision detector 44 next moves to block 412 and interfaces with the word counter 202 to check to see whether a midbit timer, internal to the word counter 202, is up yet. If not, the collision detector 44 waits. If the midbit timer is up, the collision detector 44 falls through to block 414 to check to see whether the signal on the input line 49 is equal to the signal on the bus 26. If the signal on the input line is equal to the signal on the bus 26, the collision detector 44 branches to block 416 and begins to interface with the framing error detector 204 in blocks 416 and 418. The collision detector 44 checks to see whether the stop bit time is up yet in block 416. If not, the collision detector returns to block 412. If the stop bit time is up, the collision detector 44 falls through to block 418 to check to see whether the stop bit level is on the bus 26. If the stop bit level is on the bus 26, the collision detector 44 returns to block 404 to see whether the start bit signal is on the data bus 26.

If the stop bit level is not on the bus 26 as checked in block 418, the collision detector 44 falls through to block 420 to check to see whether a reset has been received from the idle detector or idle flip flop 207. If not, the collision detector 44 waits. If the reset has been received, the collision detector 44 returns to block 402.

Returning to the block 414, if the in signal to the collision detector 44 is not equal to the bus signal, the collision detector 44 falls through to block 422 to break the connection between the collision detector 44 input and output and to set the signal on its output line B equal to the idle level. Next, the collision detector 44 falls through to block 420 as previously described.

Referring now to FIG. 5, an example of the bus interface integrated circuit operation during arbitration is presented. The diagram shows the detailed operation of the bus interface during an arbitration. The example shows the arbitration of single byte messages, i.e., the message ID byte only, from three user microprocessors 22. Two full arbitration cycles are shown. The operation of the IDLE line is also shown.

Referring now to FIG. 6, a general message processing diagram is presented. FIG. 6 shows the general description of the steps a user microprocessor 22 would go through in order to send or receive data on the subject bus 26.

For simplicity, these steps, and the associated flowchart, use the polling type approach to detecting when events happen. Actual implementation could use interrupt detection logic and servicing routines instead. This description assumes that all necessary port and IC initialization is done elsewhere.

Beginning in block 60, the routine checks to synchronize with the bus IDLE. The program waits until the bus 26 is in the idle condition, i.e., IDLE signal on line 51 goes low, the program then falls through to point 62 to start transmitting or receiving. The idle signal is checked again in block 64 and the program waits until either the first byte, that is, the message ID byte of a message is received from the bus from block 66 of whether a message to send on the bus is available from block 68, whichever comes first. If a byte is received from the bus first, the program falls through to block 70. If a message is available to send to the bus first, then the program falls through to point 72 to attempt to win bus arbitration.

During the attempt to win bus arbitration at point 72, the first byte which is the message ID byte, is sent onto the bus 26. This is done in block 74. The program then waits until a byte is received from the bus 26 in block 76 before moving on to check on whether the arbitration was won or lost at point 78. All microprocessors with a message to send will attempt to send their first message bytes on to the bus at the same time. Only the winner will succeed in having all the bits of its first byte sent successfully over the bus.

A check on arbitration to see who won or lost is done at point 78. If the byte received back from the bus in block 80 is the same as the byte sent to the bus, then the arbitration has been won and the rest of the message can be sent at point 82. If the byte received from the bus is not the same as the byte sent to the bus, then arbitration has been lost and the byte received from the bus is the first byte of the winning message. Therefore, if arbitration is lost, the program branches to point 70.

The routine then falls through to block 84 to send the rest of the message bytes, if any, to the bus. As each byte is sent to the bus, a resultant byte is received from the bus 26. This is shown by referring to blocks 86, 88, 90 and 92. In block 86, the next message byte is sent and then its reception from the bus 26 is checked in block 88. The received byte is checked to see whether it is equal to the transmitted byte in block 90 and if it is, the program returns to block 84 to again check for more message bytes. If the received byte is not equal to the transmitted byte, the program falls through to block 92 and terminates the message transmission due to a collision.

When all the message bytes have been sent, the program falls through from block 84 through to point 94 indicating that the send message is complete. The transmitted message is then deleted from the input queue in block 96. At this point, the routine returns to point 60 to synchronize or to resynchronize with the bus idle condition.

Returning now to point 70, where the system is set to receive a message, the program checks in block 98 to see whether the message is of interest to this particular microcomputer or microprocessor. If the message is not of interest, the program returns to resynchronize with the bus idle condition at point 60. If the message is of interest, the program falls through to block 100 to save the received byte and wait for the reception of the other bytes of the message from the bus, or for the bus to go idle, i.e., low. These steps are done in blocks 102 and 104.

When the bus goes idle, the program falls through to point 106 indicating that the received message is complete. The microcomputer or user microprocessor 22 is then allowed to process the received message in block 108 and/or make it available for further processing by others. The program then falls through to point 60 to resynchronize again with the bus IDLE condition.

The protocol which best meets the requirements for a Data Communications Network is Carrier Sense Multi Access (CSMA). These requirements are outlined in the Miesterfeld SAE Paper No. 860389 which is expressly incorporated by reference.

A deterministic priority access method of resolving contention was chosen instead of the non-deterministic random back-off procedure associated with classic collision detection.

Figure 7:
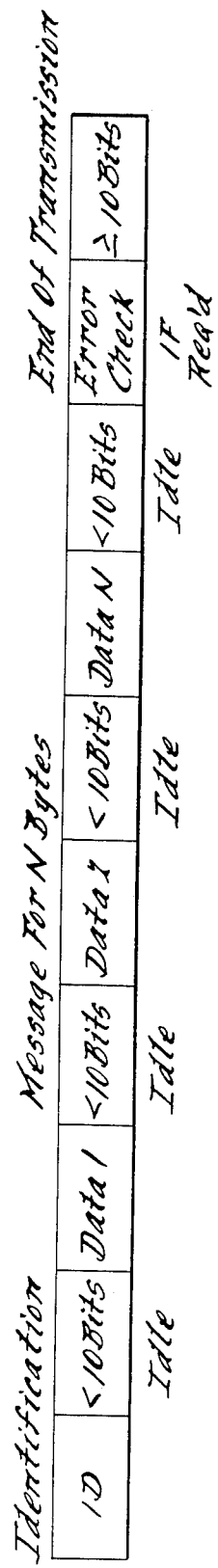
FIG. 7 is an illustration of the message format.

Refer now to FIG. 7, where the message format is presented.

Take note that idle periods, shown in FIG. 7, are allowed between each byte of data. This permits the use of firmware control and direct connection to a host microprocessor or microcomputer's asynchronous serial I/O port. Standard UART NRZ is the bit encoding technique.

Now that the invention has been described, a more detailed explanation is here provided regarding the actual operation of the bus interface IC 24.

ZERO BITS HAVE PRIORITY OVER ONE BITS

The differential transceiver output circuit 32 used in the bus interface IC 24 gives priority to a zero bit over a one bit.

The nominal or idle signal on the bus is a one bit. If the bus 26 is idle or if a user microprocessor is sending a one bit, then a one appears on the bus 26. Only when a bus interface IC 24 sends a zero bit does a zero bit appear on the bus 26.

If the multiple bus interface IC's 24 are sending data on the bus 26 simultaneously, as is done at bus arbitration, with one or more bus interface ICs 24 outputting a one bit on the bus 26 and at least one bus interface IC 24 is outputting a zero bit, then a zero bit will appear on the bus 26.

Zero bits always win out over one bits on the bus 26.

ARBITRATION DETECTION

The arbitration detector 42 passes a byte from the user microprocessor 22 onto the collision detector 44 if its start bit arrives before or within ¼ bit time after a start bit appears on the bus 26.

Once set, the arbitration detector 42 blocks the user microprocessor 22 from accessing the bus 26 until after the next bus idle condition.

The arbitration detector 44 performs its check at the beginning of the start bit of every byte in a message, but it is really only effective for the first byte of a message.

COLLISION DETECTOR

The collision detector 44 compares the bits being sent to the bus 26 from the user microprocessor 22 with the bits being received by the bus interface IC 24 from the bus 26. the collision detector 44 controls the connection between the user microprocessor 22 and the bus 26 either allowing the user microprocessor's 22 bits to reach the bus 26 or blocking the bits from reaching the bus 26.

The collision detector 44 differs from the arbitration detector 42 in that the collision detector 44 compares all the bits of the transmitted and received bytes, start bit through stop bit inclusive, and it does its comparison during the middle of the bit interval. The arbitration detector 42 only works on the start bit of every byte and it does its comparison ¼ bit time after the beginning of the start bit.

At the detection of a bus idle condition, the collision detector 44 is reset to allow data from the user microprocessor 22 to reach the bus 26.

The collision detector 44 begins to block data farom reaching the bus 26 as soon as it detects a difference between the current bit the user microprocessor 22 is trying to send on the bus 26 and the current bit the bus interface IC 24 is receiving from the bus 26.

Once set, the collision detector 44 will continue to block data transmitted from user microprocessor 22 from reaching the bus 26 until it is reset at the bus idle condition.

The collision detector 44 is reset only at bus idle.

User microprocessors 22 that lose arbitration normally will not try to send any additional message bytes once they have lost arbitration. If they do, all of the message bytes they may send to the bus interface IC 24 will be blocked from reaching the bus 26 by the collision detector 44.

REFLECTED BYTES

Whenever a user microprocessor 22 sends a byte to the bus interface IC 24 for transmission, it always receives back a reflected byte.

The reflected byte is the byte that was actually seen on the bus 26 and is the effective sum of all of the data being transmitted on the bus 26 at the same time, given the way the differential transceiver 32 operates, i.e., zero bits have priority, and any noise or other outside signals that may be on the bus 26.

At arbitration, or after a collision with noise or other outside signals, the reflected byte may bear little resemblance to the original message byte. This is the result of the bus driver 39 giving priority to the zero bits over one bits.

The user microprocessor 22 must always wait and compare the reflected byte it receives back from the bus interface IC 24 with the last byte it tried to transmit to see if it lost out at arbitration or if its data collided with noise or other interfering signals on the bus 26. In both cases, the reflected byte will not equal the last byte transmitted and the user microprocessor 22 should stop attempting to transmit message bytes. After losing out at arbitration, a user microprocessor 22 must check the received message ID byte to see if it needs to receive the winning message.

ATTEMPTED TRANSMISSIONS

All transmissions on the bus 26 are really attempted transmissions. A number of factors may interfere with the transmission a given user microprocessor 22 may be trying to make, such as: (1) the arbitration and collision detectors 42 and 44, respectively, will cut off or block the transmission of data from a user microprocessor 22 to the bus 26; (2) after a user microprocessor 22 goes through the motions of transmitting a byte, it must look at the reflected byte to see what actually made it to the bus 26; (3) at arbitration, the user microprocessor 22 attempts to send its message ID byte. If it wins the use of the bus 26, it attempts to send any remaining message bytes.

Generally, attempts to transmit on the bus 26 will be successful, but the user microprocessor must process message byte transmissions as attempts, compare the reflected byte/bytes with the last transmitted byte/bytes and be ready to handle attempt failures.

ARBITRATION

Arbitration or bus arbitration is the attempted transmission on the bus 26 of a message ID byte by one or more user microprocessors.

The purpose of arbitration is to enable a user microprocessor 22 to obtain sole use of the bus 26 for the purpose of transmitting a message.

Arbitration begins either 2 bit time after bus idle begins or later when a user microprocessor 22 has a message to transmit if the bus 26 is still idle.

The 2 bit time delay between the beginning of the bus idle (i.e., IDLE going low) and the beginning of arbitration is called the start of message delay (SOM Delay). An automatic 2 bit time delay is built into the bus interface IC 24. User microprocessors 22 that use the SCI support will experience an inherent delay of approximately 2 bit time in their SCI port.

Due to the arbitration detector 42 and collision detector 44, the priority of zero bits over one bits on the bus 26 and the use of unique message ID bytes for all messages on the bus 26, only one message ID byte will be successfully transmitted at arbitration if one or multiple user microprocessors 22 attempt arbitration at the same time.

If one user microprocessor 22 attempts arbitration and wins the bus 26, all other user microprocessors 22 will be blocked from transmitting until after a bus idle condition by their arbitration and collision detectors 42 and 44, respectively.

If multiple user microprocessors 22 attempt arbitration, and all begin to transmit their start bits within ¼ bit time of each other, then the effect of zero bits having priority over one bits and the use of unique message ID bytes will cause the collision detector 44 in all but one transmitting bus interface IC 24 to begin to block their access to the bus 26 sometime between the first and last data bits of their message ID bytes.

Any user microprocessor 22-bus interface IC 24 combination that begins to transmit the start bit of their message ID byte later than ¼ bit time after the first start bit appears on the bus 26, after bus idle, will be blocked from accessing the bus 26 by the arbitration detector 42 and will be kept from accessing the bus 26 until the bus idle resets the arbitration detector 42 and collision detector 44.

All user microprocessors 22 on the bus 26, whether they are attempting to transmit a message ID byte or not, will receive the successful message ID byte.

The start of arbitration is synchronized in all user microprocessors 22 and bus interface ICs 24 by the occurrence of bus idle, i.e., when IDLE goes from high to low. The earliest the transmission of the message ID byte should begin on the bus is 2 bit time after bus idle occurs, i.e., no user microprocessor 22-bus interface IC 24 combination should start transmitting a message ID byte sooner than that.

Arbitration ends when only one user microprocessor 22 has access to the bus 26 due to the blocking action of the arbitration detector 42 and collision detector 44 in all the other bus interface ICs 24 on the bus 26.

Each user microprocessor 22 that attempted to transmit a message ID byte, must compare the reflected byte they received with the message ID byte they tried to transmit in order to find out if they won arbitration or not.

Those user microprocessors 22 whose reflected message ID byte does not equal the message ID byte they attempted to transmit, have lost at arbitration. The reflected message ID byte equals the attempted ID byte only for the winning microprocessor 22, assuming the use of unique message IDs.

User microprocesors 22 that have lost arbitration should consider their attempted message transmission as aborted, stop attempting to transmit any remaining bytes in their messages, and wait until bus idle reoccurs before attempting to transmit their message again. Their collision detector 44 will not let them transmit anything onto the bus 26 until bus idle reoccurs anyway.

Losing user microprocessors 22 should also consider receiving and processing the arbitration winner's message. The message might be for them.

If the message the winning user microprocessor 22 is transmitting has any additional bytes, it must continue transmitting them. In doing so, it must not exceed the interbyte gap maximum of 7 bit times between the end of a stop bit and the beginning of the next start bit. If the bus goes idle for 8 bit times, all bus interface ICs 24 interpret that as a bus idle condition which will cause them to reset their arbitration detector 42 and collision detector 44 and signal bus idle to their user microprocessors 22 through the IDLE line 52. The user microprocessors 22 with messages to send will, in turn, begin to send their message ID bytes while the old winning user microprocessor 22 is still trying to send one of its message data bytes. Even the old winning user microprocessor 22 will see its IDLE go low.

When the winning user microprocessor 22 has transmitted all the bytes in its message, it stops sending bytes to the bus interface IC 24 and waits for the bus idle again.

BUS IDLE

Bus idle is the operating state of the bus 26 where no user microprocessor 22 has control of the bus 26.

Bus idle starts when the transmission of the last message on the bus 26 ends.

Bus idle ends when the bit of a message ID byte is detected on the bus 26.

Bus idle is detected by all bus interface ICs 24 on a given bus 26 and is indicated to their respective user microprocessors 22 through the IDLE line 51. IDLE goes low at the beginning of bus idle and goes high at the end of bus idle.

the start of bus idle causes the reset of the arbitration detector 42 and collision detector 44 in all the bus interface ICs 24 on the bus 26.

The start of bus idle functionally indicates to all user microprocessors 22 that: (1) the last message on the bus 26 has ended; (2) the next byte on the bus 26 should be interpreted as a message ID byte; and (3) bus arbitration should begin 2 bit time later.

In detail, bus idle starts after the occurrence of a 10 bit consecutive interal after a valid stop bit detected after an 8 bit interval afater a start bit is detected on the bus 26.

The 10 bit consecutive idle interval is 10 bits of continuous idle (1). Normally, the 10 bit idle interval will begin after the stop bit (1) of a transmitted byte and will end 10 bit times later if no additional bytes are transmitted by the current owner of the bus 26. If at stop bit time, the stop bit is not detected, i.e., a 0 is detected, the 10 bit idle interval will not start until the bus 26 goes idle (1).

If during the monitoring for the 10 bit consecutive idle interval, a non-idle signal is detected, i.e., noise, then the 10 bit idle interal restarts. If, in fact, a start bit is detected during the wait for the 10 bit idle interval, then the wait for 8 data bits, a stop bit and the 10 bit consecutive idle interal restarts.

FALSE IDLE TRANSITION

The IDLE line goes high whenever the idle detector 54 detects a transition from an idle level (1) to a low level (0). If the low level lasts for longer than ¼ bit time, then IDLE will stay high until after the usual idle criteria has occurred. However, if the bus 26 has a signal that goes from idle to low and stays there for less than ¼ bit time, then the IDLE line 51 will go high and then low again, creating a false bus idle transition.

User microprocessors 22 that detect this false transition must take it into consideration depending on what they are trying to do. Generally, they will not have to do anything. For example, SCI users that are waiting for the completion of the 2 bit time delay inherent in SCI type ports, can still wait for the reception of a reflected byte.

User microprocessors must not assume that a message has been received when this occurs.

While the present invention has been disclosed with the preferred embodiment thereof, it should be understood that there may be other embodiments which fall within the spirit and scope of the invention and that the invention is susceptible to modification, variation and change without departing from the proper scope or fair meaning of the following claims.

We claim:

1. In a communication system for transmission of digital messages through a data bus between two or more user microprocessors coupled to the data bus by means of a data bus interface integrated circuit, a method for blocking data transmission from the user microprocessor to the data bus when the data bus is busy comprising:
   synchronizing the communication system with the occurrence of a bus idle condition;
   waiting until the synchronization occurs before transmitting or receiving data messages;
   if the data bus is in an idle condition, determining whether the user microprocessor has a message available to send;
   attempting to win bus arbitration if a message is available to send by sending a message ID byte;
   checking to see whether the message ID byte was received from the data bus;
   checking to see whether the arbitration was won or lost if the message ID byte was received from the data bus, by comparing the received message ID byte to see whether it is equal to the transmitted ID byte;
   sending the rest of the message if the received message ID byte is equal to the transmitted message ID byte;
   determining whether any more message bytes are to be sent to the data bus and sending the next message byte if needed;
   deleting the transmitted message fromthe input queue if the message is complete and returning to resynchronize with the bus idle condition;
   checking to see whether the next message byte was received from the data bus if more messages need to be sent;

checking to see whether the received byte is equal to the transmitted byte and returning to check whether any more message bytes need to be sent if the received byte is equal to the transmitted byte and terminating the message transmission due to a collision if the received byte is not equal to the transmitted byte and returning to resynchronize with the bus idle condition;

checking to see whether any message ID byte is to be received if the data bus is in an idle condition;

checking to see whether the message is of interest to the user microprocessor, returning to resynchronize with the bus idle condition if it is not and saving the received byte if it is;

checking to see if there is a next byte to be received if the received byte is saved;

checking to see whether the data bus is in an idle condition and processing the received message if the data bus is in an idle condition before returning to resynchronize with the bus idle condition, but returning to look for the reception of the next byte if the bus is not in an idle condition.

2. In communication system for the transmission of messages through a data bus between one or more user microprocessors coupled to the data bus, the user microprocessors having a serial communications interface (SCI) port along with a clock port and an input/output port, the user microprocessors being coupled to the data bus by a bus interface integrated circuit, the bus interface circuit including an arbitration detector, a collision detector, a word counter, a start bit detector, a framing error detector, an idle detector, and a midbit timer, a method used by the bus interface integrated circuit, of arbitrating data from the data bus, the data having at least one start bit and at least one stop bit, with a bit-wise contention and a deterministic priority access method to (a) resolve contentions among user microprocessors that try to send messages at the same time and to (b) synchronize each data byte and to (c) allow the priority of an ID byte of the message to determine which of a plurality of messages will be sent first in the case of a contention, the determination of which user microprocessor transmits first being made without losing bus time when contention occurs; the method comprising:

monitoring the data bus until a start bit signal is on the data bus indicating that a start bit may be on the bus;

starting a word counter, if a start bit signal is on the data bus;

monitoring the data bus to see whether a start bit level has been reached on the data bus indicating that a start bit is on the bus, if not, returning to monitor the data bus until a start bit signal is on the data bus;

monitoring the start bit detector to see if the start bit detector time is up if the start bit level is on the data bus, and returning to monitor the data bus to see whether a start bit level has been reached on the data bus if the start bit detector time is not up;

monitoring the input to the arbitration detector to see whether it is at a start bit level, setting the output of the arbitration detector equal to an idle level to indicate that the bus is idle if the signal on the input line to the arbitration detector is not at the start bit level;

if the signal on the input line to the arbitration detector is at the start bit level, monitoring the framing error detector until the stop bit time is up;

if the stop bit time is up, monitoring the data bus to see if the stop bit level is on the data bus, returning to monitor the data bus until the start bit signal is on the data bus, if the stop bit level is not on the data bus;

monitoring the idle detector until a reset signal is received from the idle detector if the stop bit level is not on the data bus, and returning to repeat the above steps if the reset signal has been received from the idle detector.

3. In communication system for the transmission of messages through a data bus between one or more user microprocessors coupled to the data bus, the user microprocessors having a serial communications interface (SCI) port along with a clock port and input/output port, the user microprocessors being coupled to the data bus by a bus interface integrated circuit, the bus interface circuit including an arbitration detector, a collision detector, a word counter, a start bit detector, a framing error detector, an idle detector, and a midbit timer, a method, used by the bus interface integrated circuit, of collision detection of data from the data bus, the data having at least one start bit and at least one stop bit, with a bit-wise contention and a deterministic priority access method to (a) resolve contentions among user microprocessors that try to send messages at the same time and to (b) synchronize each data byte and to (c) allow the priority of an ID byte of the message to determine which of a plurality of messages will be sent first in the case of a contention, the determination of which user microprocessor transmits first being made without losing bus time when contention occurs; the method comprising:

monitoring the data bus until a start bit signal is on the data bus indicating that a start bit may be on the bus;

if the start bit signal is on the data bus, starting the word counter;

monitoring the data bus to see if the start bit level is on the data bus indicating that a start bit is on the bus, returning to monitor the data bus until a start bit signal is on the data bus if the start bit level is not on the bus;

monitoring the start bit detector to see if the start bit detector time is up if the start bit level is on the data bus, returning to monitor the data bus to see whether the start bit level is on the data bus if the start bit detector time is not up;

if the start bit detector time is up, monitoring the midbit timer in the word counter until it is up;

if the midbit timer is up, monitoring the input to the collision detector to see whether it is the same as the data on the data bus;

monitoring the framing error detector to see whether the stop bit time is up if the input to the collision detector is the same as the data on the data bus, returning to monitor the midbit timer until it is up if the stop bit time is not yet up;

monitoring the data bus to see whether the stop bit level is on the data bus if the stop bit time is up, returning to monitor the data bus until a start bit signal is on the data bus if the stop bit level is on the bus;

monitoring the idle detector until a reset signal has been received from the idle detector if the stop bit level is not on the bus;

returning to repeat the above procedure once the reset signal is received from the idle detector;

setting the output of the collision detector equal to the idle level if the input to the collision detector is not the same as the data on the data bus and thereafter monitoring the idle detector until a reset signal has been received and thereafter returning to repeat the above procedure.

* * * * *